United States Patent
Kim et al.

(10) Patent No.: US 8,836,692 B2
(45) Date of Patent: Sep. 16, 2014

(54) IMAGE DISPLAY DEVICE CAPABLE OF SWITCHING FOR 2D MODE AND 3D MODE

(75) Inventors: Jooah Kim, Seoul (KR); Kwangjo Hwang, Anyang-si (KR); Euitae Kim, Goyang-si (KR); Joonyoung Park, Paju-si (KR); Seungho Baek, Paju-si (KR); Jeongki Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 144 days.

(21) Appl. No.: 13/546,463

(22) Filed: Jul. 11, 2012

(65) Prior Publication Data

US 2013/0016089 A1    Jan. 17, 2013

(30) Foreign Application Priority Data

Jul. 15, 2011   (KR) .................. 10-2011-0070327

(51) Int. Cl.
    G09G 5/00        (2006.01)
    H04N 13/04       (2006.01)
    G02B 27/26       (2006.01)
    G09G 3/00        (2006.01)
    G09G 3/36        (2006.01)

(52) U.S. Cl.
    CPC ........ G02B 27/26 (2013.01); *G09G 2300/0443* (2013.01); H04N 13/0452 (2013.01); *G09G 3/3614* (2013.01); *G09G 2300/0842* (2013.01); G09G 3/3655 (2013.01); H04N 13/0434 (2013.01); *G09G 3/003* (2013.01)

USPC .......................................... 345/214; 345/211

(58) Field of Classification Search
    None
    See application file for complete search history.

(56) References Cited

U.S. PATENT DOCUMENTS

| 2010/0289884 | A1 | 11/2010 | Kang | |
|---|---|---|---|---|
| 2011/0058024 | A1* | 3/2011 | Choi et al. | 348/51 |
| 2011/0169871 | A1 | 7/2011 | Suzuki et al. | |
| 2012/0262430 | A1* | 10/2012 | Ho et al. | 345/204 |

* cited by examiner

*Primary Examiner* — Amr Awad
*Assistant Examiner* — Donna Lui
(74) *Attorney, Agent, or Firm* — Birch, Stewart, Kolasch & Birch, LLP

(57) ABSTRACT

An image display device includes a display panel which selectively displays a 2D image and a 3D image and includes a plurality of pixels, a patterned retarder for dividing light from the display panel into first polarized light and second polarized light, and a control voltage generation circuit which generates a 2D control voltage at an off-level and generates a 3D control voltage alternately having a slight-on level and the off-level every predetermined period of time. The slight-on level is higher than the off-level and is lower than a full-on level. Each pixel includes a main display unit including a first pixel electrode and a first common electrode and a subsidiary display unit including a second pixel electrode, a second common electrode, and a discharge control switch.

11 Claims, 12 Drawing Sheets

IMAGE DISPLAY DEVICE CAPABLE OF SWITCHING FOR 2D MODE AND 3D MODE

This application claims the priority benefit of Korean Patent Application No. 10-2011-0070327 filed on Jul. 15, 2011, which is incorporated herein by reference for all purposes as if fully set forth herein.

BACKGROUND OF THE INVENTION

1. Field of the Invention

Embodiments of the invention relate to an image display device capable of selectively implementing a two-dimensional plane image (hereinafter referred to as '2D image') and a three-dimensional stereoscopic image (hereinafter referred to as '3D image').

2. Discussion of the Related Art

Recently, an image display device may selectively implement a 2D image and a 3D image due to the development of various contents and circuit technology. The image display device implements the 3D image using a stereoscopic technique or an autostereoscopic technique.

The stereoscopic technique, which uses a parallax image between left and right eyes of a user with a high stereoscopic effect, includes a glasses type method and a non-glasses type method, both of which have been put to practical use. In the non-glasses type method, an optical plate such as a parallax barrier for separating an optical axis of the parallax image between the left and right eyes is generally installed in front of or behind a display screen. In the glasses type method, left and right eye images each having a different polarization direction are displayed on a display panel, and a stereoscopic image is implemented using polarized glasses or liquid crystal (LC) shutter glasses.

An LC shutter glasses type image display alternately displays a left eye image and a right eye image on a display element every one frame and opens and closes a left eyeglass and a right eyeglass of LC shutter glasses in synchronization with a display timing, thereby implementing the 3D image. The LC shutter glasses open only the left eyeglass during odd-numbered frame periods, in which the left eye image is displayed, and open only the right eyeglass during even-numbered frame periods, in which the right eye image is displayed, thereby making binocular disparity in a time division method. In the LC shutter glasses type image display, because the LC shutter glasses are turned on in a short period of time, a luminance of the 3D image is low. Further, a 3D crosstalk is extremely generated because of the synchronization between the display element and the LC shutter glasses and the ON/OFF conversion response characteristic.

As shown in FIG. 1, a polarized glasses type image display includes a patterned retarder 2 attached to a display panel 1. The polarized glasses type image display alternately displays left eye image data L and right eye image data R on the display panel 1 every one horizontal line and converts polarization characteristics of light incident on polarized glasses 3 using the patterned retarder 2. Through such an operation of the polarized glasses type image display, a left eye image and a right eye image may be spatially divided, thereby implementing a 3D image.

In the polarized glasses type image display, because the left eye image and the right eye image are adjacently displayed on the adjacent horizontal lines of the display panel 1, a range of a vertical viewing angle, in which a crosstalk is not generated, is narrow. The crosstalk is generated when a doubled image of the left eye image and the right eye image is displayed. To prevent the crosstalk in the polarized glasses type image display, as shown in FIG. 2, a method for forming black stripes BS in an area of a patterned retarder 2 to thereby widen a vertical viewing angle of the 3D image had been proposed in Japanese Laid Open Publication No. 2002-185983. However, the black stripes BS of the patterned retarder 2 used to widen the vertical viewing angle cause side effects resulting in a large reduction in a luminance of a 2D image.

SUMMARY OF THE INVENTION

Embodiments of the invention provide an image display device capable of widening a vertical viewing angle of a 3D image without a reduction in a luminance of a 2D image.

In one aspect, there is an image display device including a display panel configured to selectively display a 2D image and a 3D image, the display panel including a plurality of pixels; a patterned retarder configured to divide light from the display panel into first polarized light and second polarized light; and a control voltage generation circuit configured to generate a 2D control voltage at an off-level and generate a 3D control voltage alternately having a slight-on level and the off-level every predetermined period of time, the slight-on level being higher than the off-level and being lower than a full-on level, wherein each of the plurality of pixels includes: a main display unit including a first pixel electrode connected to a data line through a first switch and a first common electrode which is opposite to the first pixel electrode and is connected to a common line; and a subsidiary display unit including a second pixel electrode connected to the data line through a second switch, a second common electrode which is opposite to the second pixel electrode and is connected to the common line, and a discharge control switch which selectively connects the second pixel electrode to the common line in response to the 2D control voltage and the 3D control voltage, wherein the discharge control switch is continuously held in an off-state based on the 2D control voltage in a 2D mode for a display of the 2D image and is alternately held in a slight-on state and the off-state based on the 3D control voltage in a 3D mode for a display of the 3D image.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Exemplary embodiments of the invention will be described with reference to FIGS. 3 to 18.

Figure 1:
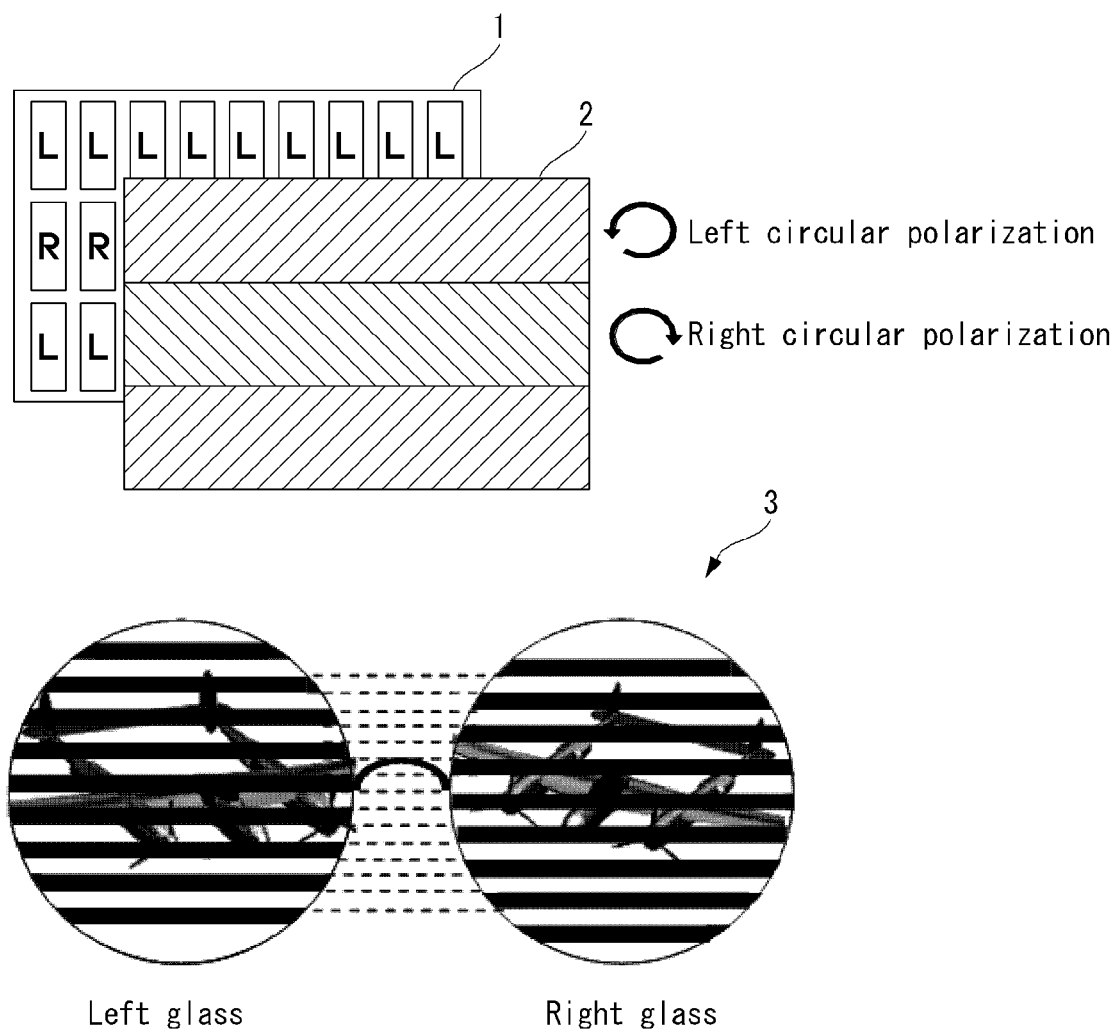
FIG. 1 illustrates a related art polarized glasses type image display.
Figure 2:
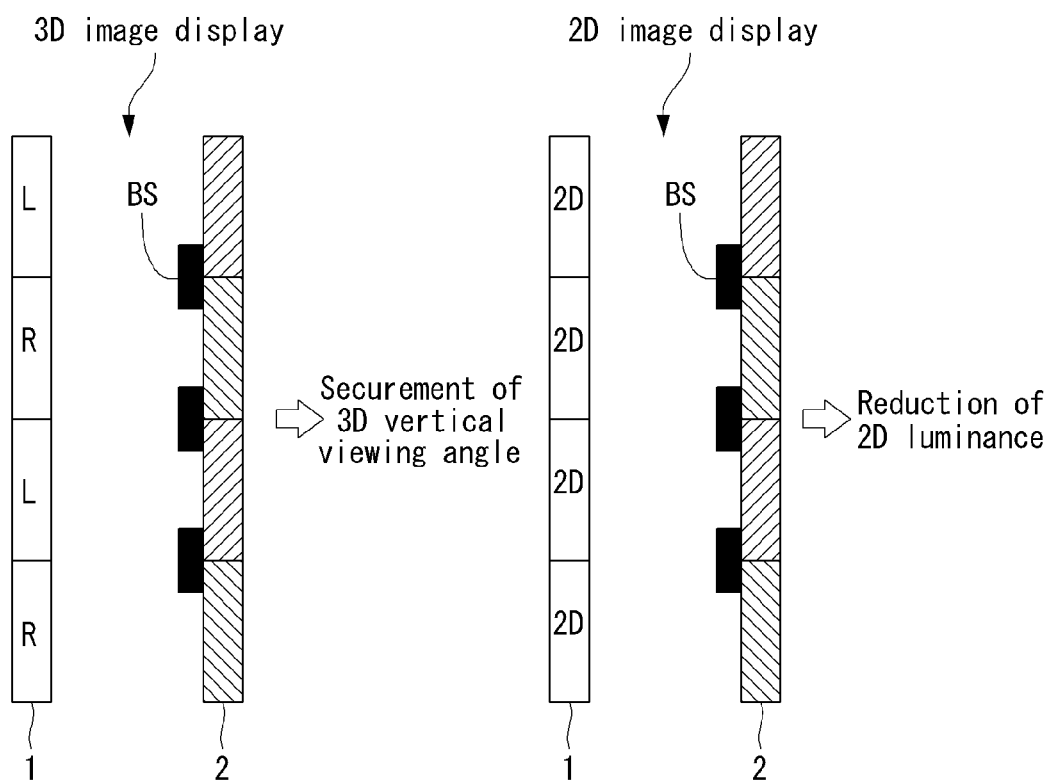
FIG. 2 illustrates that a luminance of a 2D image is reduced by black stripes used to widen a vertical viewing angle in a related art polarized glasses type image display.
Figure 3:
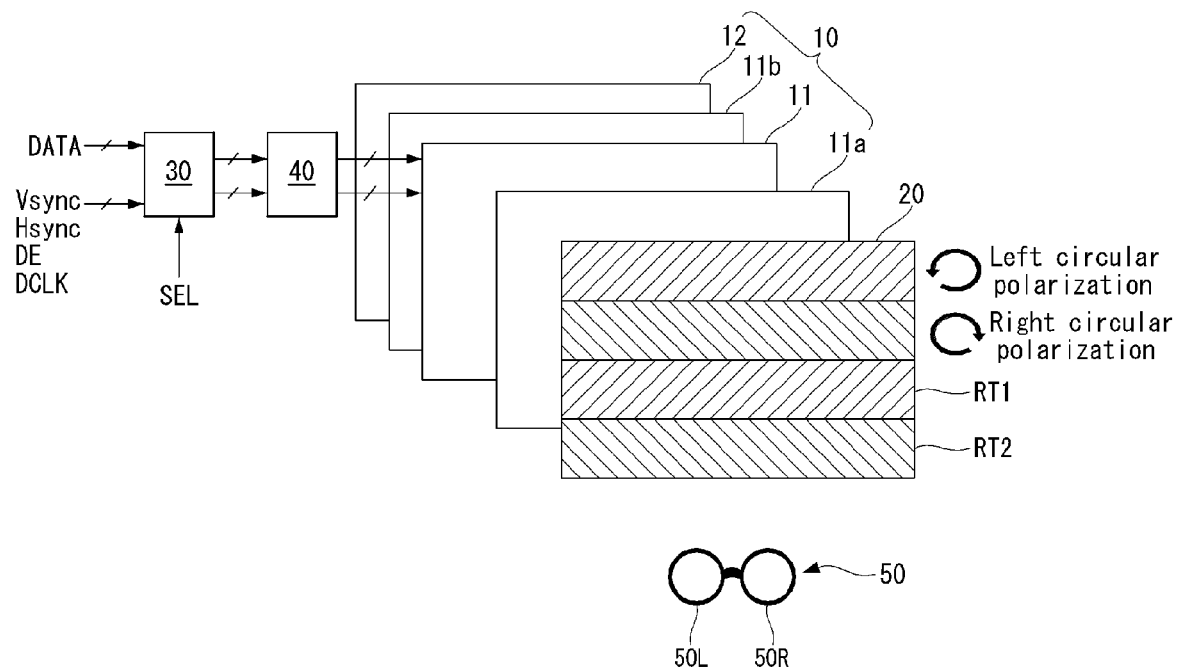
FIGS. 3 and 4 illustrate a polarized glasses type image display according to an exemplary embodiment of the invention.
Figure 4:
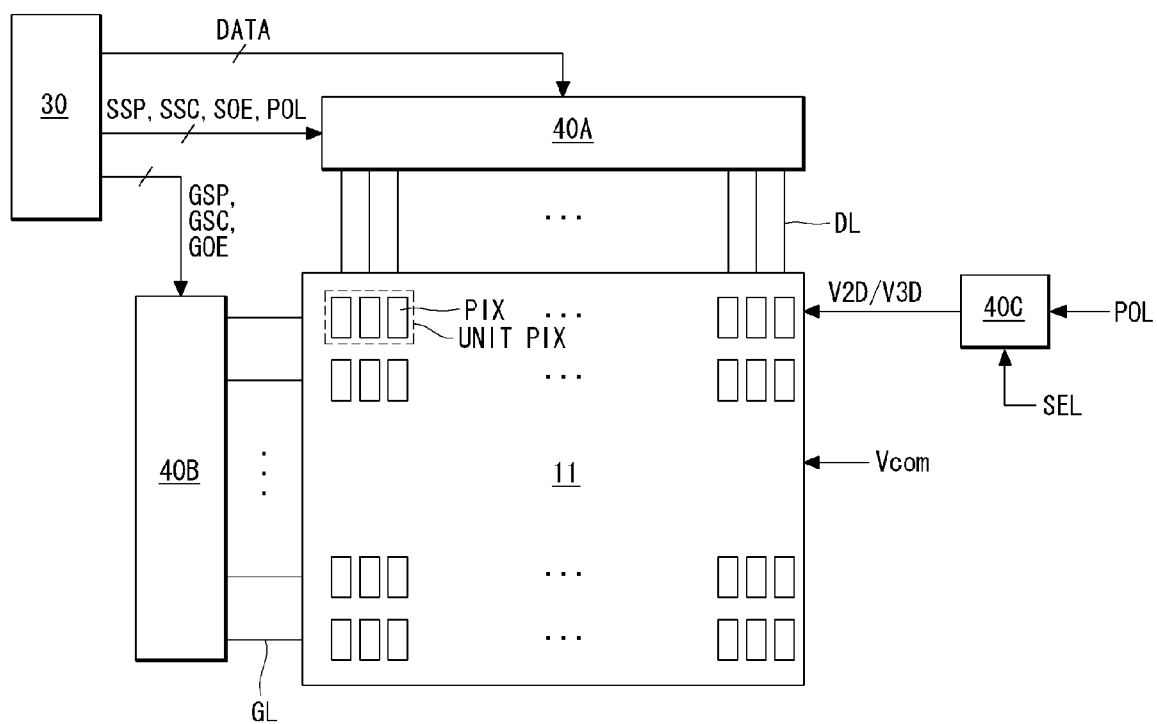
Figure 5:
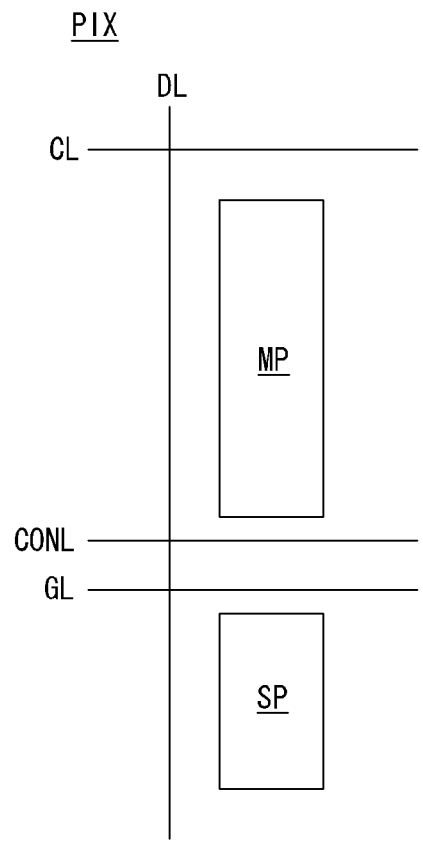
FIG. 5 illustrates one of a plurality of pixels shown in FIG. 4.

FIGS. 3 and 4 illustrate a polarized glasses type image display according to an exemplary embodiment of the invention. FIG. 5 illustrates one of a plurality of pixels shown in FIG. 4.

As shown in FIGS. 3 and 4, the image display device according to the embodiment of the invention includes a display element 10, a patterned retarder 20, a controller 30, a panel driving circuit 40, and polarized glasses 50.

The display element 10 may be implemented as a flat panel display such as a liquid crystal display, a field emission display (FED), a plasma display panel (PDP) display, an electroluminescence device (EL) including an inorganic electroluminescence element and an organic light emitting diode (OLED), and an electrophoretic display (EPD). In the following description, the image display device according to the embodiment of the invention is described using the liquid crystal display as the display element 10.

The display element 10 includes a display panel 11, an upper polarizing film 11a, and a lower polarizing film 11b.

The display panel 11 includes an upper glass substrate, a lower glass substrate, and a liquid crystal layer between the upper and lower glass substrates. A plurality of data lines DL and a plurality of gate lines GL crossing the plurality of data lines DL are disposed on the lower glass substrate of the display panel 11. A plurality of unit pixels UNIT PIX are disposed on the display panel 11 based on a crossing structure between the data lines DL and the gate lines GL, thereby constituting a pixel array. Each of the plurality of unit pixels UNIT PIX includes three pixels PIX respectively displaying red (R), green (G), and blue (B) images. As shown in FIG. 5, each pixel PIX includes a main display unit MP and a subsidiary display unit SP with the gate line GL and a discharge control line CONL interposed between them. A plurality of common lines CL, to which a common voltage Vcom is supplied, and a plurality of discharge control lines CONL, to which a 2D control voltage V2D or a 3D control voltage V3D is supplied, are disposed on the lower glass substrate of the display panel 11, so as to drive the pixels PIX. When the gate line GL is activated to a gate high voltage, the main display unit MP and the subsidiary display unit SP are commonly connected to the data line DL. The discharge control line CONL is activated to the 3D control voltage V3D of a slight-on level, the subsidiary display unit SP is connected to the common line CL. In a 2D mode, the subsidiary display unit SP displays the same 2D image as the main display unit MP. On the other hand, in a 3D mode, the subsidiary display unit SP displays a black image unlike the main display unit MP displaying a 3D image. Hence, the subsidiary display unit SP widens a vertical viewing angle of the 3D image without a reduction in a luminance of the 2D image.

Black matrixes and color filters are formed on the upper glass substrate of the display panel 11. The upper polarizing film 11a is attached to the upper glass substrate of the display panel 11, and the lower polarizing film 11b is attached to the lower glass substrate of the display panel 11. Alignment layers for setting a pre-tilt angle of liquid crystals are respectively formed on the upper and lower glass substrates of the display panel 11. In a vertical electric field driving manner such as a twisted nematic (TN) mode and a vertical alignment (VA) mode, common electrodes, to which the common voltage Vcom is supplied, may be formed on the upper glass substrate. In a horizontal electric field driving manner such as an in-plane switching (IPS) mode and a fringe field switching (FFS) mode, the common electrodes may be formed on the lower glass substrate along with pixel electrodes. A column spacer may be formed between the upper and lower glass substrates to keep cell gaps of liquid crystal cells of the display panel 11 constant.

The display element 10 according to the embodiment of the invention may be implemented as any type liquid crystal display including a transmissive liquid crystal display, a transflective liquid crystal display, and a reflective liquid crystal display. A backlight unit 12 is necessary in the transmissive liquid crystal display and the transflective liquid crystal display. The backlight unit 12 may be implemented as a direct type backlight unit or an edge type backlight unit.

The patterned retarder 20 is attached to the upper polarizing film 11a of the display panel 11. The patterned retarder 20 includes a plurality of first retarders RT1, which are respectively formed on odd-numbered lines of the patterned retarder 20, and a plurality of second retarders RT2, which are respectively formed on even-numbered lines of the patterned retarder 20. Light absorption axes of the first retarders RT1 are different from light absorption axes of the second retarders RT2. The first retarders RT1 are opposite to odd-numbered pixel lines of the pixel array, and the second retarders RT2 are opposite to even-numbered pixel lines of the pixel array. Each of the first retarders RT1 retards a phase of linearly polarized light incident through the upper polarizing film 11a by quarter wavelength and transmits it as first polarized light (for example, left-circularly polarized light). Each of the second retarders RT2 retards a phase of linearly polarized light incident through the upper polarizing film 11a by three-quarter wavelength and transmits it as second polarized light (for example, right-circularly polarized light).

The controller 30 controls an operation of the panel driving circuit 40 in the 2D mode and the 3D mode in response to a mode selection signal SEL. The controller 30 receives the mode selection signal SEL through a user interface such as a touch screen, an on-screen display (OSD), a keyboard, a mouse, and a remote controller. The controller 30 may switch between an operation of the 2D mode and an operation of the 3D mode in response to the mode selection signal SEL. The controller 30 detects a 2D/3D identification code encoded to data of an input image, for example, a 2D/3D identification code capable of being coded to an electronic program guide (EPG) or an electronic service guide (ESG) of a digital broadcasting standard, thereby distinguishing between the 2D mode and the 3D mode.

In the 3D mode, the controller 30 divides data of the 3D image received from a video source into RGB data of a left eye image and RGB data of a right eye image and then supplies the RGB data of the left eye image and the RGB data of the right eye image to the panel driving circuit 40. In the 2D mode, the controller 30 supplies RGB data of a 2D image received from the video source to the panel driving circuit 40.

The controller 30 generates control signals for controlling operation timing of the panel driving circuit 40 using timing signals such as a vertical sync signal Vsync, a horizontal sync signal Hsync, a data enable signal DE, and a dot clock DCLK.

A data control signal for controlling operation timing of a data driver 40A of the panel driving circuit 40 includes a source start pulse SSP, a source sampling clock SSC, a source output enable SOE, a polarity control signal POL, and the like. The source start pulse SSP indicates a supply start time point of data corresponding to one horizontal line in one horizontal period during which the data corresponding to the one horizontal line is displayed. The source sampling clock SSC controls a latch operation of data based on a rising or falling edge thereof. The source output enable SOE controls an output of the data driver 40A. The polarity control signal POL controls a polarity of a data voltage to be supplied to the liquid crystal cells of the display panel 11.

A gate control signal for controlling operation timing of a gate driver 40B of the panel driving circuit 40 includes a gate start pulse GSP, a gate shift clock GSC, a gate output enable GOE, and the like. The gate start pulse GSP indicates a start horizontal line of a scan operation in one vertical period during which one screen is displayed. The gate shift clock GSC is input to a shift register inside the gate driver 40B and sequentially shifts the gate start pulse GSP. The gate output enable GOE controls an output of the gate driver 40B.

The controller 30 may multiply the frequency of the timing signals Vsync, Hsync, DE, and DCLK synchronized with an input frame frequency by N to obtain a frame frequency of (f×N) Hz, where N is a positive integer equal to or greater than 2 and f is the input frame frequency. Hence, the controller 30 may control the operation of the panel driving circuit 40 based on the frame frequency of (f×N) Hz. The input frame frequency is 50 Hz in a phase alternate line (PAL) scheme and is 60 Hz in a national television standards committee (NTSC) scheme.

The panel driving circuit 40 includes the data driver 40A for driving the data lines DL of the display panel 11, the gate driver 40B for driving the gate lines GL of the display panel 11, and a control voltage generation circuit 40C for driving the discharge control lines CONL of the display panel 11.

The data driver 40A includes a plurality of driving integrated circuits (ICs). Each of the plurality of driving ICs includes a shift register, a latch, a digital-to-analog converter (DAC), an output buffer, etc. The data driver 40A latches the RGB data of the 2D or 3D image in response to the data control signals SSP, SSC, and SOE. The data driver 40A converts the RGB data of the 2D or 3D image into analog positive and negative gamma compensation voltages in response to the polarity control signal POL and inverts a polarity of the data voltage. The data driver 40A outputs the data voltage to the data lines DL, so that the data voltage is synchronized with a scan pulse (or a gate pulse) output from the gate driver 40B. The driving ICs of the data driver 40A may be bonded to the lower glass substrate of the display panel 11 through a tape automated bonding (TAB) process.

The gate driver 40B generates the scan pulse, which swings between a gate high voltage and a gate low voltage, in response to the gate control signals GSP, GSC, and GOE. The gate driver 40B supplies the scan pulse to the gate lines GL in a line sequential manner in response to the gate control signals GSP, GSC, and GOE. The gate driver 40B includes a gate shift register array, etc. The gate shift register array of the gate driver 40B may be formed in a non-display area outside a display area of the display panel 11, in which the pixel array is formed, in a gate-in-panel (GIP) manner. A plurality of gate shift registers included in the gate shift register array may be formed with along the pixel array in a thin film transistor (TFT) process of the pixel array in the GIP manner. The gate shift register array of the gate driver 40B may be implemented as a plurality of driving ICs bonded to the lower glass substrate of the display panel 11 through the TAB process.

The control voltage generation circuit 40C generates the 2D control voltage V2D and the 3D control voltage V3D and selectively supplies the 2D control voltage V2D and the 3D control voltage V3D to the discharge control lines CONL in response to the mode selection signal SEL. The 2D control voltage V2D may be generated at an off-level substantially equal to the gate low voltage. The 3D control voltage V3D may be generated at the slight-on level, which is higher than the off-level and is lower than a full-on level, and may be alternately generated at the off-level and the slight-on level every predetermined period of time. The 2D control voltage V2D and the 3D control voltage V3D are supplied to a gate electrode of a discharge control switch DST shown in FIG. 13 and switch on or off the discharge control switch DST.

The polarized glasses 50 include a left eyeglass 50L having a left eye polarizing filter and a right eyeglass 50R having a right eye polarizing filter. The left eye polarizing filter has the same light absorption axis as the first retarder RT1 of the patterned retarder 20, and the right eye polarizing filter has the same light absorption axis as the second retarder RT2 of the patterned retarder 20. For example, a left circular polarizing filter may be selected as the left eye polarizing filter of the polarized glasses 50, and a right circular polarizing filter may be selected as the right eye polarizing filter of the polarized glasses 50. A user may view the 3D image, which is displayed on the display element 10 in a spatial division manner, through the polarized glasses 50.

Figure 6:
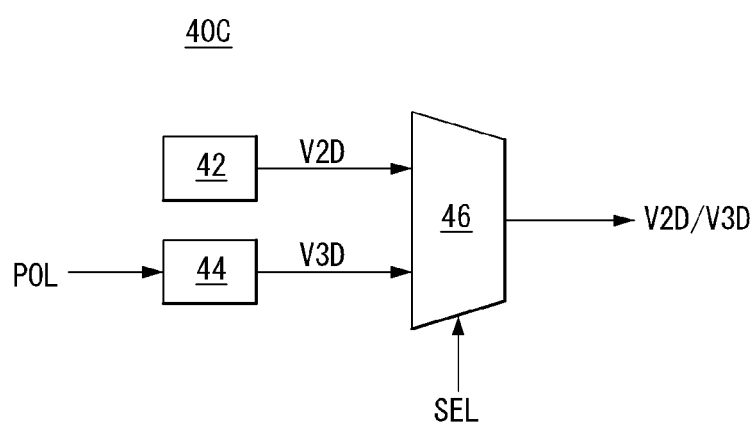
FIG. 6 illustrates a configuration of a control voltage generation circuit shown in FIG. 4.
Figure 7:
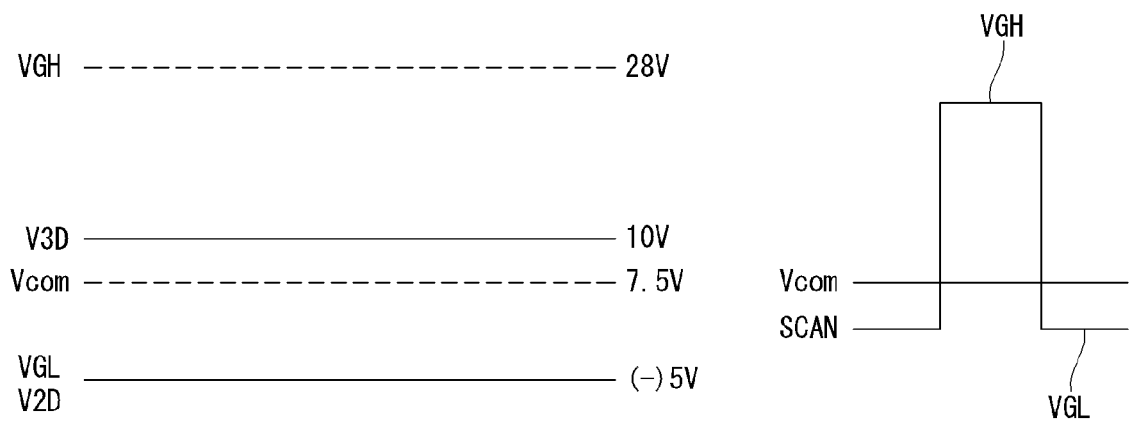
FIG. 7 illustrates a voltage level of a 2D control voltage.
Figure 8:
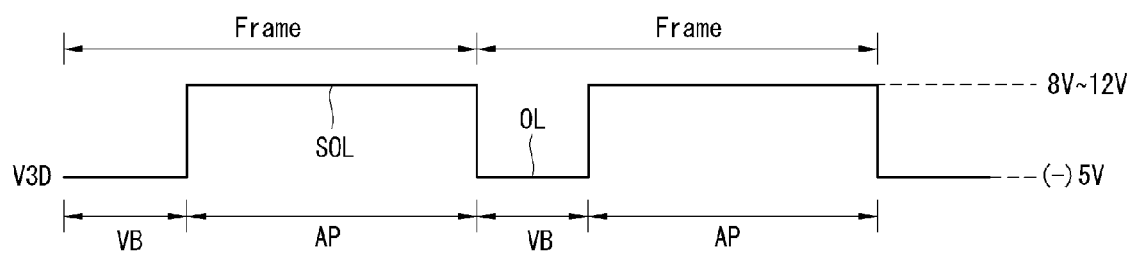
FIG. 8 illustrates a voltage level of a 3D control voltage.

FIG. 6 illustrates a configuration of the control voltage generation circuit 40C shown in FIG. 4. FIG. 7 illustrates a voltage level of the 2D control voltage V2D, and FIG. 8 illustrates a voltage level of the 3D control voltage V3D.

As shown in FIG. 6, the control voltage generation circuit 40C includes a first control voltage generator 42, a second control voltage generator 44, and a multiplexer 46.

The first control voltage generator 42 generates the 2D control voltage V2D for controlling the discharge control switch using an input DC power source. As shown in FIG. 7, the 2D control voltage V2D may be generated at the same voltage level as a gate low voltage VGL of a scan pulse SCAN. When the gate low voltage VGL of the scan pulse SCAN capable of turning off TFTs of the display panel 11 is selected as the voltage of about −5V, the 2D control voltage V2D may be generated as the voltage of about −5V.

The second control voltage generator 44 generates the 3D control voltage V3D for controlling the discharge control switch based on the polarity control signal POL received from the controller 30. As shown in FIG. 8, the 3D control voltage V3D is generated at a slight-on level SOL and is reduced to the same off-level OL as the gate low voltage VGL every predetermined period of time. The slight-on level SOL is higher than the common voltage Vcom and is lower than a gate high voltage VGH of the scan pulse SCAN. When the gate high voltage VGH of the scan pulse SCAN capable of making the TFTs of the display panel 11 be full-on is selected as the voltage of about 28V and the common voltage Vcom is selected as the voltage of about 7.5V, the 3D control voltage V3D of the slight-on level SOL may be generated as the voltage of about 8V to 12V. The 3D control voltage V3D of the off-level OL is about −5V and reduces a positive gate-bias stress of the discharge control switch. A period, during which the 3D control voltage V3D of the slight-on level SOL is generated, may correspond to a display period AP during which effective video data is displayed in each frame. A period, during which the 3D control voltage V3D of the off-level OL is generated, may correspond to a non-display period (i.e., a vertical blank period VB) between the adjacent display periods AP. A length of the period, during which the 3D control voltage V3D of the slight-on level SOL is generated, may be greater or less than a length of the display period AP depending on a design specification. Further, a length of the period, during which the 3D control voltage V3D of the off-level OL is generated, may be less or greater than a length of the vertical blank period VB depending on the design specification. Because the second control voltage generator 44 generates the 3D control voltage V3D based on the polarity control signal POL, the second control voltage generator 44 may generate the 3D control voltage V3D without a modification of the controller 30 and a limitation of a resolution and all of frequencies for the 3D image.

The multiplexer 46 selectively outputs the 2D control voltage V2D and the 3D control voltage V3D to the discharge control line CONL in response to the mode selection signal SEL. The multiplexer 46 outputs the 2D control voltage V2D in the 2D mode and outputs the 3D control voltage V3D in the 3D mode.

Figure 9:
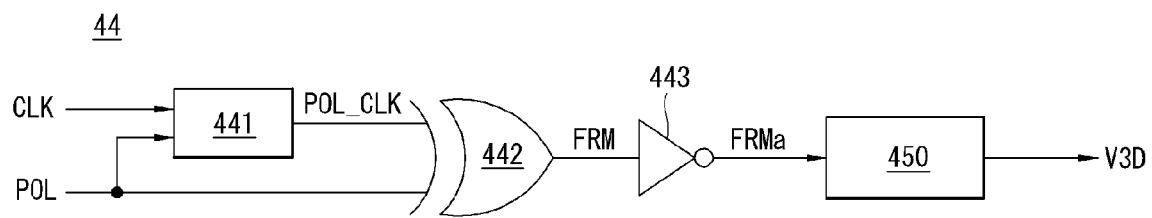
FIGS. 9 and 10 illustrate an example of a second control voltage generator of FIG. 6 for generating a 3D control voltage.
Figure 10:
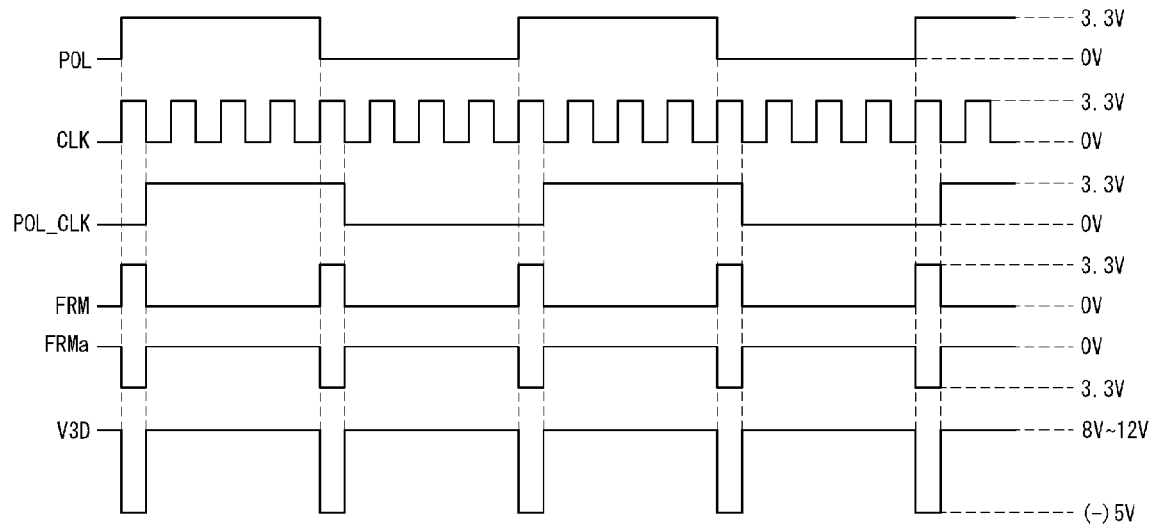

FIGS. 9 and 10 illustrate an example of the second control voltage generator 44 of FIG. 6 for generating the 3D control voltage V3D.

As shown in FIGS. 9 and 10, the second control voltage generator 44 includes a first delay unit 441, an exclusive OR (XOR) element 442, an inverter 443, and a level shifter 450.

The first delay unit 441 receives the polarity control signal POL of a transistor-transistor logic (TTL) level (for example, about 0V to 3.3V) and clocks CLK from the controller 30 and delays the polarity control signal POL by a predetermined value in response to the clocks CLK. Hence, the first delay unit 441 outputs a first polarity control signal POL_CLK.

The XOR element 442 performs an XOR operation on the polarity control signal POL received from the controller 30 and the first polarity control signal POL_CLK received from the first delay unit 441 to output a first operational signal FRM.

The inverter 443 inverts the first operational signal FRM received from the XOR element 442 to output a second operational signal FRMa. The second operational signal FRMa alternately has a high logic voltage (about 3.3V) and a low logic voltage (about 0V) every predetermined period of time.

The level shifter 450 level-shifts the second operational signal FRMa of the TTL level received from the inverter 443 and generates the 3D control voltage V3D swinging between the off-level (about −5V) and the slight-on level (about 8V to 12V).

Figure 11:
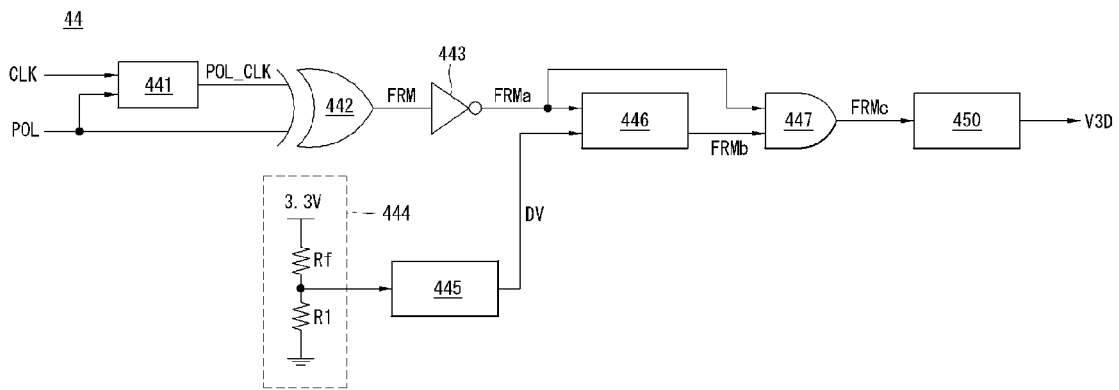
FIGS. 11 and 12 illustrate another example of a second control voltage generator of FIG. 6 for generating a 3D control voltage.
Figure 12:
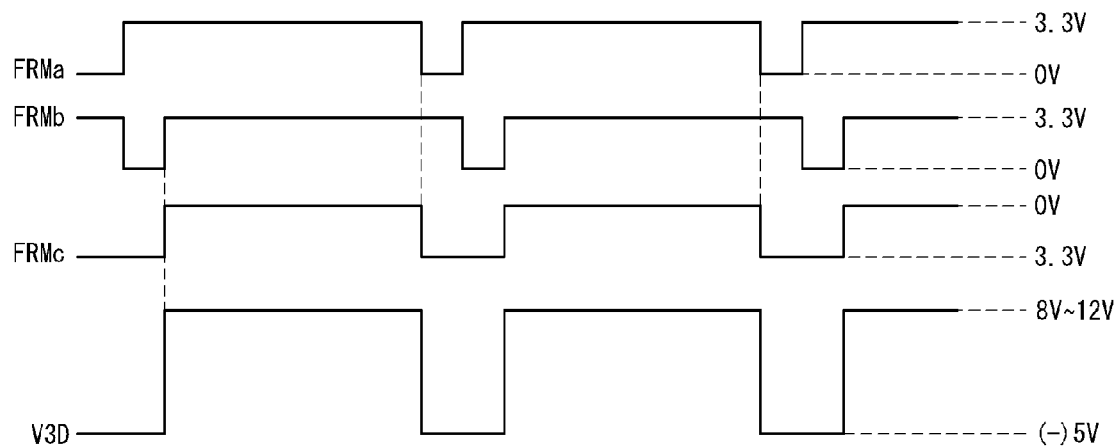

FIGS. 11 and 12 illustrate another example of the second control voltage generator 44 of FIG. 6 for generating the 3D control voltage V3D.

As shown in FIGS. 11 and 12, the second control voltage generator 44 includes a first delay unit 441, an XOR element 442, an inverter 443, a voltage divider 444, an analog-to-digital converter (ADC) 445, a second delay unit 446, an AND element 447, and a level shifter 450.

Since the first delay unit 441, the XOR element 442, and the inverter 443 are substantially the same as those shown in FIGS. 9 and 10, a further description may be briefly made or may be entirely omitted.

The voltage divider 444 includes two resistors Rf and R1 which are connected in series to each other. The voltage divider 444 divides the high logic voltage (about 3.3V) and outputs a division value.

The ADC 445 receives the division value from the voltage divider 444 and performs analog-to-digital conversion on the division value. The ADC 445 outputs a delay value DV corresponding to the division value.

The second delay unit 446 delays the second operational signal FRMa received from the inverter 443 by the delay value DV received from the ADC 445 to output a third operational signal FRMb.

The AND element 447 performs an AND operation on the second operational signal FRMa received from the inverter 443 and the third operational signal FRMb received from the second delay unit 446 to output a fourth operational signal FRMc. The fourth operational signal FRMc alternately has the high logic voltage (about 3.3V) and the low logic voltage (about 0V) every predetermined period of time. A generation width of the low logic voltage in the fourth operational signal FRMc is wider than a generation width of the low logic voltage in the second operational signal FRMa.

The level shifter 450 level-shifts the fourth operational signal FRMc of the TTL level received from the AND element 447 and generates the 3D control voltage V3D swinging between the off-level (about −5V) and the slight-on level (about 8V to 12V).

As can be seen from FIGS. 11 and 12, because a width of the off-level (about −5V) of the 3D control voltage V3D may be additionally adjusted using the voltage divider 444, the period, during which the 3D control voltage V3D of the off-level OL is generated, may easily correspond to the non-display period (i.e., the vertical blank period VB) between the adjacent display periods AP as shown in FIG. 8.

Figure 13:
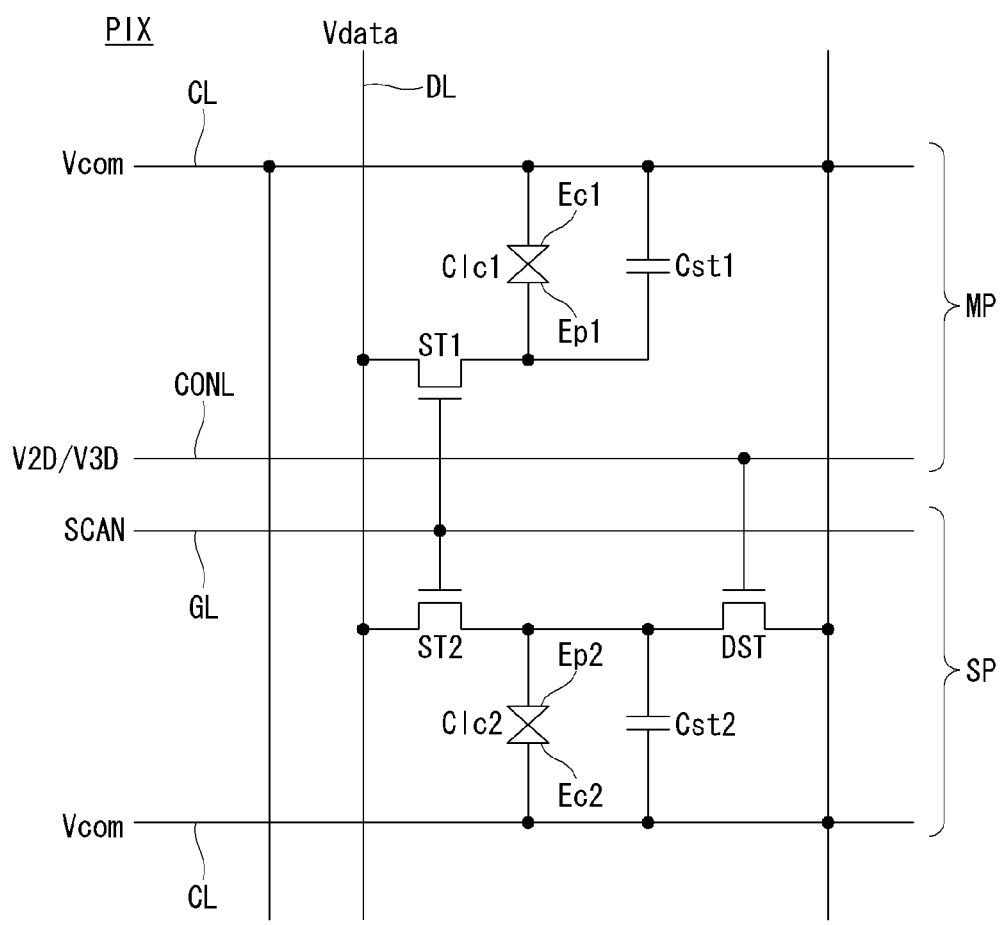
FIG. 13 illustrates a connection configuration of a pixel shown in FIG. 5.
Figure 14:
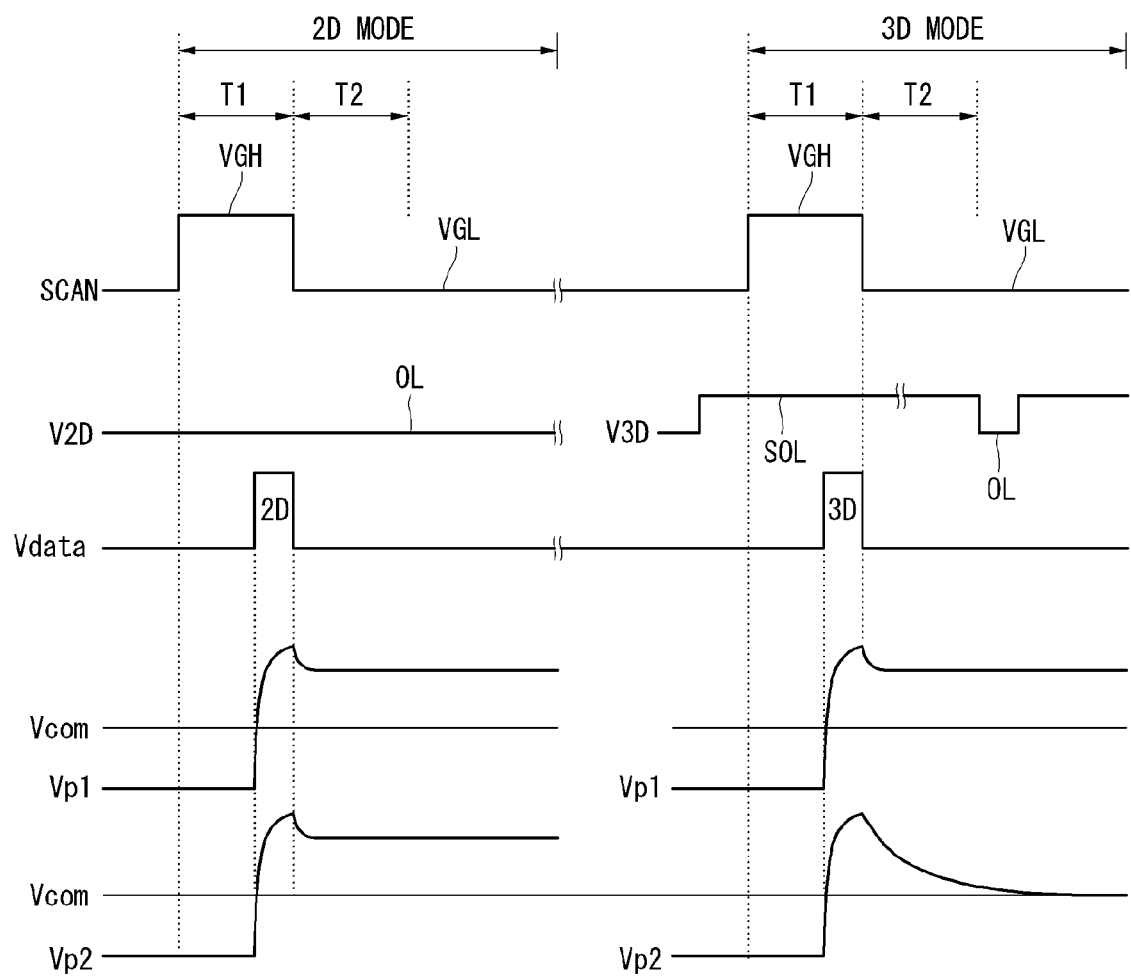
FIG. 14 illustrates charge and discharge waveforms of a pixel in each driving mode.
Figure 15:
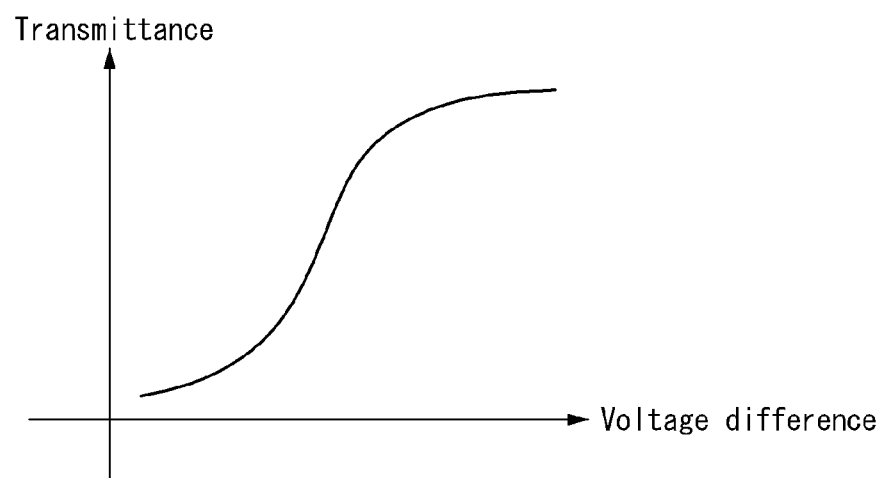
FIG. 15 illustrates a relationship between a transmittance and a voltage difference between a pixel electrode and a common electrode.
Figure 16:
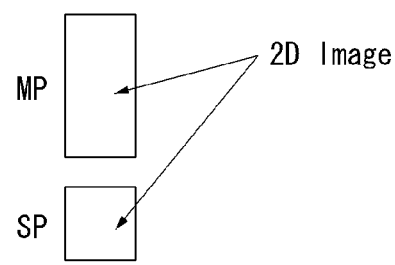
FIGS. 16 to 18 illustrate an operation effect depending on a charge waveform shown in FIG. 14.
Figure 17:
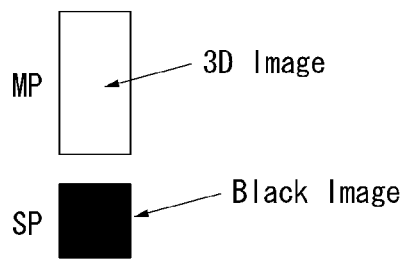
Figure 18:
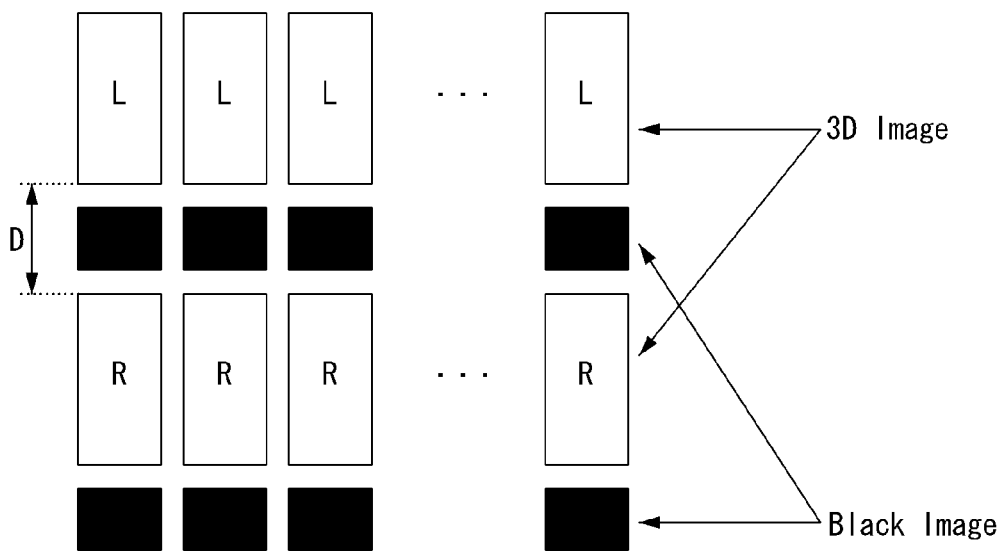

FIG. 13 illustrates in detail a connection configuration of the pixel PIX shown in FIG. 5. FIG. 14 illustrates charge and discharge waveforms of the pixel PIX in each driving mode. FIG. 15 is a graph illustrating a relationship between a transmittance and a voltage difference between the pixel electrode and the common electrode. FIGS. 16 to 18 illustrate an operation effect depending on the charge waveform shown in FIG. 14.

As shown in FIG. 13, the pixel PIX includes the main display unit MP and the subsidiary display unit SP with the gate line and the discharge control line CONL interposed between them.

The main display unit MP includes a first pixel electrode Ep1, a first common electrode Ec1 which is opposite to the first pixel electrode Ep1 and constitutes a first LC capacitor Clc1, and a first storage capacitor Cst1. The first pixel electrode Ep1 is connected to the data line DL through a first switch ST1. The first switch ST1 is turned on in response to the scan pulse SCAN and thus applies a data voltage Vdata on the data line DL to the first pixel electrode Ep1. A gate electrode of the first switch ST1 is connected to the gate line GL, a source electrode of the first switch ST1 is connected to the data line DL, and a drain electrode of the first switch ST1 is connected to the first pixel electrode Ep1. The first common electrode Ec1 is connected to the common line CL charged to the common voltage Vcom. The first storage capacitor Cst1 is formed by an overlap of the first pixel electrode Ep1 and the common line CL with an insulating layer interposed between them.

The subsidiary display unit SP includes a second pixel electrode Ep2, a second common electrode Ec2 which is opposite to the second pixel electrode Ep2 and constitutes a second LC capacitor Clc2, and a second storage capacitor Cst2. The second pixel electrode Ep2 is connected to the data line DL through a second switch ST2. The second switch ST2 is turned on in response to the scan pulse SCAN and thus applies the data voltage Vdata on the data line DL to the second pixel electrode Ep2. A gate electrode of the second switch ST2 is connected to the gate line GL, a source electrode of the second switch ST2 is connected to the data line DL, and a drain electrode of the second switch ST2 is connected to the second pixel electrode Ep2. The second common electrode Ec2 is connected to the common line CL charged to the common voltage Vcom. The second storage capacitor Cst2 is formed by an overlap of the second pixel electrode Ep2 and the common line CL with an insulating layer interposed between them.

The second pixel electrode Ep2 is connected to the common line CL through the discharge control switch DST. The discharge control switch DST switches on or off a current path between the second pixel electrode Ep2 and the common line CL in selective response to the 2D control voltage V2D and the 3D control voltage V3D. A gate electrode of the discharge control switch DST is connected to the discharge control line CONL, a source electrode of the discharge control switch DST is connected to the second pixel electrode Ep2, and a drain electrode of the discharge control switch DST is connected to the common line CL. When the 2D control voltage V2D is applied to the discharge control line CONL, the discharge control switch DST completely closes a source-drain channel of the discharge control switch DST and cuts off the current path between the second pixel electrode Ep2 and the common line CL. When the 3D control voltage V3D of the slight-on level SOL is applied to the discharge control line CONL, the discharge control switch DST partially opens the source-drain channel of the discharge control switch DST and partially allows the current path between the second pixel electrode Ep2 and the common line CL. When the 3D control voltage V3D of the off-level OL is applied to the discharge control line CONL, the discharge control switch DST completely closes the source-drain channel of the discharge control switch DST and cuts off the current path between the second pixel electrode Ep2 and the common line CL. When the 3D control voltage V3D of the off-level OL is applied to the discharge control line CONL, a gate-bias stress accumulated on the gate electrode of the discharge control switch DST is removed.

The discharge control switch DST may be designed, so that it has the same channel capacitance as the first and second switches ST1 and ST2. Thus, the discharge control switch DST has the slight-on level SOL lower than the full-on level by applying the 3D control voltage V3D of the slight-on level SOL lower than the gate high voltage VGH to the discharge control line CONL. Even if the second switch ST2 and the discharge control switch DST are simultaneously turned on, an amount of current flowing through the discharge control switch DST is less than an amount of current flowing through the second switch ST2. This is because even if the second switch ST2 and the discharge control switch DST are simultaneously turned on, a channel resistance of the discharge control switch DST is greater than a channel resistance of the second switch ST2. The channel resistance of the switch is inversely proportional to the voltage applied to the gate electrode of the switch.

An operation and an operation effect of the pixel PIX having the above-described connection configuration are described below.

First, in the 2D mode, the discharge control switch DST is continuously held in a turn-off state in response to the 2D control voltage V2D during periods T1 and T2.

During the period T1, the first and second switches ST1 and ST2 are simultaneously turned on at the full-on level in response to the scan pulse SCAN, which is input at the same voltage level as the gate high voltage VGH.

The first pixel electrode Ep1 of the main display unit MP is charged to a first pixel voltage Vp1 as the data voltage Vdata for the display of the 2D image due to a turn-on operation of the first switch ST1. The second pixel electrode Ep2 of the subsidiary display unit SP is charged to a second pixel voltage Vp2 as the data voltage Vdata for the display of the 2D image due to a turn-on operation of the second switch ST2. Because the first and second switches ST1 and ST2 are designed in the same manner, the second pixel voltage Vp2 is substantially equal to the first pixel voltage Vp1.

During the period T2, the first and second switches ST1 and ST2 are simultaneously turned off in response to the scan pulse SCAN, which is input at the same voltage level as the gate low voltage VGL.

When the first switch ST1 is turned off, the first pixel voltage Vp1, which has been charged to the first pixel electrode Ep1 of the main display unit MP, is shifted by a predetermined value because of an influence of a kickback voltage and then is held at a shifted value by the first storage capacitor Cst1. When the second switch ST2 is turned off, the second pixel voltage Vp2, which has been charged to the second pixel electrode Ep2 of the subsidiary display unit SP, is shifted by a predetermined value because of the influence of the kickback voltage and then is held at a shifted value by the second storage capacitor Cst2.

During the periods T1 and T2, the common voltage Vcom is applied to the first common electrode Ec1 of the main display unit MP and the second common electrode Ec2 of the subsidiary display unit SP. A difference between the first pixel voltage Vp1 and the common voltage Vcom is substantially equal to a difference between the second pixel voltage Vp2 and the common voltage Vcom. A voltage difference between the pixel electrode and the common electrode and a transmittance has a proportional relationship illustrated in FIG. 15. As a result, as shown in FIG. 16, the main display unit MP and the subsidiary display unit SP display the 2D image of the same gray level. The 2D image displayed on the subsidiary display unit SP functions to increase the luminance of the 2D image.

Next, in the 3D mode, the discharge control switch DST is alternately held in an on-state of the slight-on level and an off-state every predetermined period of time in response to the 3D control voltage V3D. For example, the discharge control switch DST is held in the on-state of the slight-on level during the display period and is held in the off-state during the vertical blank period between the display periods. The periods T1 and T2 belong to the display periods.

During the period T1, the first and second switches ST1 and ST2 are simultaneously turned on at the full-on level in response to the scan pulse SCAN, which is input at the same voltage level as the gate high voltage VGH.

The first pixel electrode Ep1 of the main display unit MP is charged to the first pixel voltage Vp1 as the data voltage Vdata for the display of the 3D image due to the turn-on operation of the first switch ST1. The second pixel electrode Ep2 of the subsidiary display unit SP is charged to the second pixel voltage Vp2 as the data voltage Vdata for the display of the 3D image due to the turn-on operation of the second switch ST2.

During the period T1, the channel resistance of the discharge control switch DST having the on-state of the slight-on level is much greater than the channel resistance of the second switch ST2 having the on-state of the full-on level. Hence, a discharge current drained from the second pixel electrode Ep2 is much less than a charge current entering into the second pixel electrode Ep2. As a result, during the period T1, because the discharge control switch DST having the ON-state of the slight-on level hardly affects the charge characteristic of the second pixel voltage Vp2, the second pixel voltage Vp2 is charged to the voltage level similar to the first pixel voltage Vp1.

During the period T2, the first and second switches ST1 and ST2 are simultaneously turned off in response to the scan pulse SCAN, which is input at the same voltage level as the gate low voltage VGL.

When the first switch ST1 is turned off, the first pixel voltage Vp1, which has been charged to the first pixel electrode Ep1 of the main display unit MP, is shifted by a predetermined value because of the influence of the kickback voltage and then is held at a shifted value by the first storage capacitor Cst1. When the second switch ST2 is turned off, the second pixel voltage Vp2, which has been charged to the second pixel electrode Ep2 of the subsidiary display unit SP, is discharged to the level of the common voltage Vcom for a predetermined period of time because of the discharge current drained via the discharge control switch DST. The channel resistance of the discharge control switch DST having the on-state of the slight-on level is much less than the channel resistance of the second switch ST2 having the off-state. As a result, the second pixel voltage Vp2, which has been charged to the second pixel electrode Ep2 of the subsidiary display unit SP through the discharge control switch DST, is gradually discharged and converges to the level of the common voltage Vcom within a specific period without the influence of the kickback voltage.

During the periods T1 and T2, the common voltage Vcom is applied to the first common electrode Ec1 of the main display unit MP and the second common electrode Ec2 of the subsidiary display unit SP. Unlike the difference between the first pixel voltage Vp1 and the common voltage Vcom, a difference between the second pixel voltage Vp2 and the common voltage Vcom becomes substantially zero at a time when the discharge of the second pixel electrode Ep2 is completed. As a result, according to the voltage difference-transmittance characteristic illustrated in FIG. 15, as shown in FIG. 17, the main display unit MP displays the 3D image of a predetermined gray level and the subsidiary display unit SP displays an image of a black gray level. Thus, the subsidiary display unit SP serves as an active black stripe.

As shown in FIG. 18, the black image displayed on the subsidiary display unit SP increases a display distance D between the 3D images (i.e., between the left eye image L and the right eye image R), which are adjacent to each other in a vertical direction. Hence, the vertical viewing angle of the 3D image, at which a crosstalk is not generated, may be widely secured using the black image of the subsidiary display unit SP without a separate black stripe pattern.

As described above, the image display device according to the embodiment of the invention divides each pixel into the main display unit and the auxiliary display unit having the discharge control switch. In the 3D mode, the auxiliary display unit serves as the active black stripe without the influence of the kickback voltage by controlling the discharge operation of the discharge control switch using the control voltage of the slight-on level. In the 2D mode, the discharge operation of the discharge control switch is blocked using the control voltage of the off-level. Hence, the image display device according to the embodiment of the invention can widely secure the vertical viewing angle of the 3D image without the reduction in the luminance of the 2D image.

Furthermore, the image display device according to the embodiment of the invention periodically applies the control voltage of the off-level to the discharge control switch in the 3D mode, thereby efficiently compensating for the degradation of the discharge control switch resulting from the control voltage of the slight-on level.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image display device comprising:
a display panel configured to selectively display a 2D image and a 3D image, the display panel including a plurality of pixels;
a patterned retarder configured to divide light from the display panel into first polarized light and second polarized light; and
a control voltage generation circuit configured to generate a 2D control voltage at an off-level and generate a 3D control voltage alternately having a slight-on level and the off-level every predetermined period of time, the slight-on level being higher than the off-level and being lower than a full-on level,
wherein each of the plurality of pixels includes:
a main display unit including a first pixel electrode connected to a data line through a first switch and a first common electrode which is opposite to the first pixel electrode and is connected to a common line; and
a subsidiary display unit including a second pixel electrode connected to the data line through a second switch, a second common electrode which is opposite to the second pixel electrode and is connected to the common line, and a discharge control switch which selectively connects the second pixel electrode to the common line in response to the 2D control voltage and the 3D control voltage, and
wherein the discharge control switch is continuously held in an off-state based on the 2D control voltage in a 2D mode for a display of the 2D image and is alternately held in a slight-on state and the off-state based on the 3D control voltage in a 3D mode for a display of the 3D image,
wherein a scan pulse for switching the first and second switches swings between a gate high voltage with the full-on level and a gate low voltage with the off-level,
wherein the slight-on level is higher than the gate low voltage of the scan pulse and is lower than the full-on level of the scan pulse, and
wherein when the discharge control switch is held in the slight-on state by the 3D control voltage having the slight-on level, the discharge control switch partially opens and partially allows a current path between the second pixel electrode and the common line, and when the discharge control switch is held in the off-state by the 3D control voltage having the off-level, the discharge control switch completely closes and cuts off the current path between the second pixel electrode and the common line.

2. The image display device as claimed in claim 1, wherein the control voltage generation circuit is configured to generate the 3D control voltage, a period of the slight-on level of the 3D control voltage corresponds to a display period, and a period of the off-level of the 3D control voltage corresponds to a non-display period between the adjacent display periods.

3. The image display device as claimed in claim 2, wherein the non-display period is a vertical blank period.

4. The image display device as claimed in claim 2, wherein the control voltage generation circuit outputs the 3D control voltage swinging between the slight-on level and the off-level in response to a polarity control signal, and the polarity control signal is configured to control a polarity of a data voltage for being input to the data line.

5. The image display device as claimed in claim 4, wherein the control voltage generation circuit comprises:
 a first delay unit for receiving the polarity control signal and clocks to delay the polarity control signal by a predetermined value in response to the clocks;
 an exclusive OR element for receiving the output of the first delay unit and the polarity control signal to perform an exclusive OR operation and output a first operational signal;
 an inverter for receiving and inverting the first operational signal to output a second operational signal; and
 a level shifter for receiving and leveling the second operational signal to generate the 3D control voltage.

6. The image display device as claimed in claim 4, wherein the 3D control voltage is an inverse signal of an exclusive OR result of the delayed polarity control signal and the polarity control signal, wherein the period of the off-level of the 3D control voltage is the same as half a period of the clocks.

7. The image display device as claimed in claim 4, wherein the control voltage generation circuit comprises:
 a first delay unit for receiving the polarity control signal and clocks to delay the polarity control signal by a predetermined value in response to the clocks;
 an exclusive OR element for receiving the output of the first delay unit and the polarity control signal to perform an exclusive OR operation and output a first operational signal;
 an inverter for receiving and inverting the first operational signal to output a second operational signal;
 a voltage divider for dividing a high voltage to output a division value;
 an analog-to-digital converter for receiving the division value and performing analog-to-digital conversion on the division value to output a delay value;
 a second delay unit for receiving the second operation signal received from the inverter by the delay value to delay the second operation signal by the delay value and output a third operational signal;
 an AND element for performing an AND operation on the second operational signal received from the inverter and the third operational signal received from the second delay unit to output a fourth operational signal; and
 a level shifter for receiving and leveling the fourth operational signal to generate the 3D control voltage.

8. The image display device as claimed in claim 4, wherein the period of the off-state level of the 3D control voltage is dependent on an exclusive OR result of the delayed polarity control signal and the polarity control signal, and a delayed delay value.

9. The image display device as claimed in claim 1, wherein each of the plurality of pixels includes:
 a gate line connected to the first switch and the second switch; and
 a discharge control line connected to the discharge control switch.

10. The image display device as claimed in claim 9, further comprising:
 a panel driving circuit, including:
  a data driver for driving the data line of the display panel;
  a gate driver for driving the gate line of the display panel; and
  the control voltage generation circuit; and
 a controller configured to control an operation of the panel driving circuit in the 2D mode and the 3D mode in response to a mode selection signal.

11. The image display device as claimed in claim 1, wherein when the discharge control switch is held in the off-state by the 2D control voltage, the discharge control switch completely closes and cuts off a current path between the second pixel electrode and the common line.

* * * * *